3,332,961
PREPARATION OF ORIENTED BROMO-CHLORO PHTHALOCYANINE GREEN PIGMENTS
Vito Albert Giambalvo, Middlesex, and William Lee Berry, Bridgewater Township, Somerset County, N.J., assignors to American Cyanamid Company, New York, N.Y., a corporation of Maine
No Drawing. Filed Dec. 14, 1961, Ser. No. 159,425
9 Claims. (Cl. 260—314.5)

This invention relates to improved green phthalocyanine pigments and to processes for the preparation of these novel pigments, and certain other related pigments; and more particularly to green halogenated phthalocyanine pigments in which bromine is predominantly substituted in the alpha position, and chlorine is predominantly substituted in the beta position, and hence have a uniquely yellow shade, light fastness, and great strength; and to processes for (A) the selective bromination of a phthalocyanine in predominantly the alpha position, followed by chlorination in predominantly the beta position; (B) the selective chlorination of a phthalocyanine in the beta position, followed by bromination in the alpha position; (C) the synthesis of a phthalocyanine which is brominated in the alpha position followed by chlorination in the beta position; (D) the synthesis of a phthalocyanine which is chlorinated in the beta position followed by bromination in the alpha position; (E) synthesis of a phthalocyanine from a bromo-chloro intermediate in which the bromine is predominantly in the alpha position and chlorine in predominantly the beta position; and (F) the bromination of a phthalocyanine by an inorganic bromide in the presence of chlorosulfonic acid, independent of the degree of chlorination.

The improved pigments may be represented by the formula:

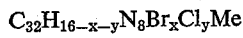

where Me represents the central hydrogens or metal of a metallized or unmetallized phthalocyanine, where the bromine atoms are attached to the phthalocyanine ring in predominantly the alpha positions of the benzo rings and $x$ is between about 3 and about 9, and where the chlorine atoms are predominantly in the beta positions of the benzo rings and $y$ is between about 6 and about 13 and where the sum of $x$ and $y$ is equal to between about 9 and 16. Whereas for any single molecule each of $x$ and $y$ must represent whole numbers, for any pigment containing a plurality of molecules, the net average value of $x$ and $y$ may be and usually is fractional. A minor portion of the bromine may be in the beta positions, and a minor portion of the chlorine may be in the alpha positions.

Whereas the present pigment is not limited to the one specific compound, for clarity the formula of one preferred component, the compound copper 1,5,8,9,12,16-hexabromo - 2,3,6,7,10,11,14,15 - octachlorophthalocyanine is shown:

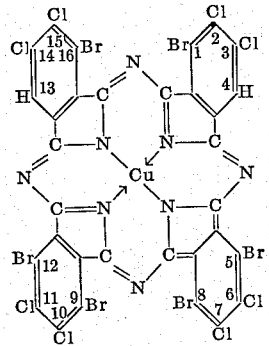

The 1, 4, 5, 8, 9, 12, 13 and 16 positions are alpha positions and the 2, 3, 6, 7, 10, 11, 14 and 15 positions are beta positions.

Although by the structural formula as above illustrated, the lower right hand ring has its benzenoid characteristics broken by double bonding to carbon in the macro ring, in fact phthalocyanine is a resonance hybrid with the resonance structure such that each of the four benzo groups may be considered as equivalent, and the benzoid characteristics of each are the same, unless distorted by substitutions. The unique stability of the phthalocyanine molecule may be in part attributable to the resonance structure and the large number of conjugated double bonds. The structure is, for its size, one of the most stable known.

Halogenated phthalocyanines as pigments have been disclosed in a number of patents and publications. In general, the halogen content has been considered independent of its location in the phthalocyanine molecule.

A complete analysis of all prior patents and publications on halogenated phthalocyanines would be too lengthy for inclusion here. A few of the prior patents include:

United States Patent 2,873,279, "Halogenation of Phthalocyanines," to Randall and Taras, Feb. 10, 1959, which reviews the prior art, discloses halogenated phthalocyanines and teaches the chlorination of copper phthalocyanine in a melt of anhydrous aluminum chloride containing 0.3 to 1.3 parts by weight of sulfur dioxide or other inorganic compound of sulfur with oxygen, halogens, or mixtures thereof. This patent discloses chlorination to a chlorine content of from about 13 to 16 chlorine atoms per molecule and in Example 13 discloses the use of aluminum chloride, thionyl chloride ($SOCl_2$) and copper phthalocyanine in which bromine is added to secure a product containing about 13 atoms of bromine (59.9%) and 2 atoms of chlorine (2.1%). This patent does not disclose bromine and chlorine substituents in oriented locations.

United States Patent 2,276,860, "Dyestuff of the Phthalocyanine Series," Niemann, Schmidt, Muehlbauer and Wiest, Mar. 17, 1942, disclosed certain dyestuffs of the phthalocyanine series containing both chlorine and bromine. Example 13 thereof discloses a product from reacting 20 parts of copper phthalocyanine, 100 parts of anhydrous aluminum chloride, and 20 parts of sodium chloride, which are triturated together, heated to 150° C., and then 50 parts of bromine are dropped upon the melt. Chlorine is then led in for 5 hours, and the melt is poured onto ice, giving a precipitated dyestuff which is boiled with dilute hydrochloric acid, then treated with sodium carbonate, water and methanol. The product is a green copper phthalocyanine containing about 6 atoms of chlorine and 8 atoms of bromine. No orientation is taught. (The advantages of the products of the present invention are secured by having the bromine predominantly in the alpha position, and the chlorine predominantly in the beta position.)

United State Patent 2,247,752, "Process for Halogenation of Phthalocyanines," Fox, July 1, 1941, in Example 1 discloses a reaction product which contains 52.3% o bromine, 3.18% of chlorine, and 4.12% of copper, in a green copper phthalocyanine. The product is described a "somewhat bluer in shade than the chlorinated phthalo cyanines having from 13 to 16 chlorine atoms."

United States Patent 2,910,482, "Phthalocyanine Color ing Matters in Pigmentary Form," Gottlieb, Oct. 27, 1959 discloses pigmentary copper halophthalocyanine in whic] not more than one chlorine or one bromine is substitute on each benzo ring, in the beta position (there called met to the nearest CN group) with a total of 5.5% to 17% halogen.

United States Patent 2,846,441, "Production of a Solvent-Stable Alpha Modification of Copper Phthalocyanine," Muehlbauer, Zell, Plankenhorn and Jutz, Aug. 5, 1958, discloses from 1 to 4 chlorine atoms in the beta position of copper phthalocyanine (there called 4 monochloro-; 4,4'-dichloro-; 4,4',4''-trichloro- and 4,4',4'',4'''-tetrachloro-copper phthalocyanine).

The product of the present invention is an oriented bromochlorophthalocyanine in pigmentary form. The pigmentary form refers to a state of the subdivision such that the material may be incorporated directly into coating compositions, printing inks, and lithographic varnishes, without further particle size reduction. In general, a pigment must have a particle size of less than about 1 micron for its maximum dimension, and it is preferred that the material have an area or surface as shown by nitrogen absorption methods of at least 30 square meters per gram. An area of at least 60 to 100 square meters per gram is preferred. A few particles larger than 1 micron in particle size do not damage the pigment, unless of large enough size to give a gritty texture but particles with a size larger than 1 micron for the pigmentary ultimates do not make a proportionate contribution to the strength of the pigment. The pigmentary ultimates are frequently flocculated in some solvents, but to be effective as a pigment, the flocs must be dispersible and it is preferred that the energy required for dispersion be of a very low value so that the pigment may be stirred into a vehicle rather than requiring a more intensive energy input, such as by milling.

Whereas salt grinding and other vigorous size reduction methods have been used, when the pigment of the present invention is prepared in accordance with the preferred embodiments of the processes of this invention, the bromochlorophthalocyanine is produced in such finely divided form that further size reduction and its attendant cost can be avoided.

The present invention will be described with particular reference to copper phthalocyanine, but it is to be understood that phthalocyanines having other metals or unmetallized phthalocyanines may be produced in pigment form by the methods of this invention and exist in pigmentary form as a product of this invention, and such oriented chlorobromo metallized and unmetallized phthalocyanine pigments are in general more yellow than the corresponding pigment in which the bromo-chloro-substituents are randomly placed, which are also greens. Usually the hue becomes increasingly green and towards yellow as the degree of halogenation is increased. The corresponding unhalogenated pthalocyanines are blues. Among the central atom metals are aluminum, antimony, cadmium, chromium, cobalt, copper, iron, lead, molybdenum, nickel, tin and zinc.

Whereas the halogenating methods of this invention are directive, it is to be understood that where the positions are not blocked by prior substitution, some halogenation may occur in both the alpha and beta positions although the predominant location of the bromine substitutions are in the alpha positions and the chlorine substitutions are in the beta positions. By predominantly it is meant at least 60% and preferably at least 80% of the particular halogen is in the specified location. Where the methods of synthesis involve a halog substituted phthalic compound, the degree of position control depends upon the purity of the starting material and whether or not subsequent halogenation of the phthalocyanine molecule is required. For instance, if a 4,5-di-chlorophthalimide of high purity is used in the synthesis, 2,3,6,7,10,11,14,15-octachlorophthalocyanine is produced which has all of the chlorine in the beta positions, When such a phthalocyanine is brominated, all of the bromination must necessarily occur in the alpha positions.

For proof of position, synthesis from phthalic compounds of known structure is advantageous. For commercial production, it is usually economically advantageous to synthesize the phthalocyanine, and then halogenate by a process which orients the bromine in the alpha positions and chlorine in the beta positions. After the first halogens are so oriented, because such positions are blocked, the orientation of the second halogens are directed by the choice of positions remaining open, and directive halogenation is not required.

In brominating copper phthalocyanine, a comparison of the relative intensity of the alpha peak at 790 millimicrons and the beta peak at 840 millimicrons, as measured in concentrated sulfuric acid gives a good measurement of the relative degree of substitution in each of these two positions. The determination is particularly useful where 4 or more bromine atoms are introduced per molecule. Obviously, if more than 8 bromine atoms are introduced those over 8 must go in the beta position.

The selective poistions give the finished pigment a yellower green color than would be obtained from random orientation of the same number of bromine and chlorine substituents and at the same time a yellow-green pigment is obtained which exhibits remarkable strength as well as light fastness.

The "color" of the phthalocyanine, more properly termed the hue, may be effectively indicated by the dominant wave length. Dominant wave length is the wave length of that pure spectral light which when mixed with white light will produce the color in question. The dominant wave length can be determined from the spectrophotometric reectance curve of the sample by procedures described in "Handbook of Colorimetry," A. C. Hardy, Technology Press, Cambridge, Massachusetts, 1936. As typical of the results are the following:

*Phthalocyanine blue*

Copper phthalocyanine (beta form) _____mu__ [1] 480
Copper phthalocyanine (alpha form) _____ [2] 482.2
Unmetallized phthalocyanine (beta) _____ 483.7

[1] Red shade blue.
[2] Green shade blue.

*Yellow shade phthalocyanine greens*

Copper phthalocyanine with $Cl_{15}$ _____ 494.9
Unmetallized phthalocyanine with $Cl_{15}$ _____ 497.9
Copper phthalocyanine with $Br_6Cl_8$ (alpha bromo) 501
Copper phthalocyanine with $Br_8Cl_6$ (alpha bromo) _____ 504.5–504.0
Copper phthalocyanine with $Br_{7\,1/2}\,Cl_{6\,1/2}$ (alpha bromo) _____ 503.5

A range of about 496 to about 506 millimicrons for copper phthalocyanine can be obtained, depending on the halogen content, with good light-fastness and excellent strength and crystallization resistance.

A 30% alkyd enamel using 1 part of the phthalocyanine pigment to 99 parts of titanium dioxide, rutile type (Unitane® OR–540) was used, and barium sulfate was used as the white standard in a G.E. recording spectrophotometer. Slightly different values may be obtained with other procedures.

From a practical standpoint, it is desirable that where possible a single pigment be used in an ink or paint system. For instance, it is theoretically possible to get a yellower shade of green by introducing a yellow pigment with a phthalocyanine. Unfortunately, when such mixtures are used, differences in light-fastness of the two pigments may cause a shift in shade on exposure to light, and differences in the flocculating characteristics can cause a drift in color during the use of the pigments, and a difference in ease of dispersion, etc. may cause difficulty in obtaining a uniform color. Further, where more than one pigment is used, there is a tendency for the combination to appear dirty or dull rather than of a uniform bright shade.

The present novel pigments may be formed by several methods:

(A) Bromination followed by chlorination

Bromination is accomplished selectively predominantly in the alpha position by brominating with elemental bromine with the phthalocyanine in a medium made up of a Friedel-Crafts type salt and a sulfur compound. The preferred Friedel-Crafts catalyst is aluminum chloride primarily because of economic considerations. Other Friedel-Crafts catalysts which are operable include: $ZrCl_4$, $BF_3$, $TiCl_4$, $SbCl_5$, $FeCl_3$, $SnCl_4$, $BiCl_3$, $AlBr_3$, $SiCl_4$, etc.

The sulfur compound is preferably sulfur dioxide which is cheap, and easy to handle. From 0.5 to 2 moles per mol of aluminum chloride gives a good reaction mixture. If at least 1 mol is used, the mixture is more easily stirred, and is preferred. Other constituents may be present which form an eutectic to lower the melting points, such as sodium chloride.

The bromination may be accomplished using bromine at temperatures between about 35° C. and 100° C. The oriented substitution may be accomplished by using an inorganic bromide such as sodium or potassium bromide or aluminum bromide, hydrogen bromide, etc., to give bromide ions which in the presence of an oxidizing agent, act as free bromine to brominate the phthalocyanine. Chlorosulfonic acid gives good results.

The amount of bromine or brominating agent is sufficient to accomplish the desired degree of bromination after which elemental chlorine, or a chlorinating agent may be introduced preferably at higher temperatures such as from 90° C. to 150° C. to accomplish the remainder of the substitution in which the chlorine is introduced up to the desired total, preferably such that the bromine is between about 3 and about 9 and the chlorine is between about 6 and about 13 and the total is between about 9 and 16 for each molecule of phthalocyanine.

The halogenation may be aided by the introduction of a small amount of a catalyst such as ferric chloride or iodine or both, other conventional halogenating catalysts may be used, such as antimony pentachloride or copper dichloride.

After the halogenation has been completed the reaction mixture is drowned in water, preferably acidified, in a fine stream with agitation. The mixture is cooled and further diluted with water. The bromochlorophthalocyanine is obtained in finely-divided form. The product as thus obtained may be filtered, washed, and used as a pigment. It may be processed by flushing into an organic solvent which aids in the removal of water-soluble components or otherwise finished in accordance with conventional procedures. The product obtained by direct halogenation has better pigmentary properties than where prepared by synthesis direct from halogenated intermediates.

(B) Chlorination followed by bromination

A phthalocyanine is chlorinated in the beta position selectively by using elemental chlorine in a nonpolar solvent such as trichlorobenzene at a temperature of from 100° C. to 150° C. After chlorination in the beta positions, the phthalocyanine can be separated from the solvent system by conventional means, after which the chlorinated phthalocyanine is brominated using any of the procedures set forth as in procedure A above. Other nonpolar solvents may be used. With high boiling solvents, atmospheric pressure may be used. With lower boiling solvents, the system must be under pressure to give a temperature of 100° C. to 150° C., preferably about 120° C. Suitable solvents include carbon tetrachloride, chlorinated ethylene, acetylene tetrachloride, and polychlorobenzenes.

(C) Synthesis of alpha-polybromophthalocyanine followed by chlorination

An alpha brominated phthalocyanine may be conveniently formed using the procedures for synthesis such as described in United States Patent 2,825,733, "Method for Making Metal Phthalocyanine Pigments," Kehe and Horne, Mar. 4, 1958. The methods described and claimed there include synthesizing in the presence of an inert high boiling point solvent such as "trichlorobenzene, chlorobenzene, dichlorobenzene, napthalene and its chlorinated derivatives, quinoline, benzophenone, nitrobenzene, etc." using a metal donor reagent selected from the group consisting of certain metals and their salts. For the present invention the metals include aluminum, antimony, cadmium, chromium, cobalt, copper, iron, lead, molybdenum, nickel, tin and zinc. A phthalocyanine forming material is used such as phthalic acid, phthalic anhydride, methyl and ethyl esters of phthalic acid, phthalamic acid, phthalimide, phthalamide and their bromo and chloro derivatives. A phthalic dinitrile may be used. The starting materials for the instant part of the present invention are restricted to those compounds having a 3-bromo or 3,6-dibromo substitution, and their mixtures, to give from 4 to 8 bromines in the alpha position. The reaction is accomplished with a phthalocyanine nitrogen donor such as urea, biuret, guanidine, guanylurea, dicyandiamide and cyanuric acid. As a catalyst is used an ester of titanium or zirconium with an alkyl, aryl, aralkyl or alkaryl radicals, the full ester with all of the valence linkages esterified is preferred. The temperature of reaction is preferably between about 150° C. and 250° C. Additional details are set forth in said Kehe et al. patent. The synthesis mixture can be cooled and the alpha-polybromophthalocyanine separated, rinsed, and then used as a starting material for the chlorination such as described in part A above. Other conventional syntheses may be used to prepare the alpha-polybromophthalocyanine which is to be chlorinated.

(D) Synthesis of beta-chlorophthalocyanine followed by bromination

A polychlorophthalocyanine may be prepared using 4-monochloro and 4,5-dichloro derivatives of the same phthalic compounds mentioned above, in part C, using sufficient of the 4,5-dichloro derivatives that the finished product have at least 6 chlorine substituents. Such a synthesis results in a polychlorophthalocyanine with the chlorines in the beta position, and depending upon the degree of chlorination of the starting materials, from 6 to 8 chlorines are present. The chlorinated product is brominated using the procedures set forth in part A or B above.

(E) Synthesis from bromochloro intermediates

Using the procedure set forth in paragraph C above, phthalic compounds may be used as the starting materials in which the 4,5-positions are chlorine substituted and the 3 or 3,6-positions are bromine substituted. A 3,6-dibromo, 4,5-dichlorophthalic compound alone or mixed with a 3-monobromo, 4,5-dichlorophthalic compound may be used in the same type of synthesis or any other conventional synthesis to give an alpha-polybromo-beta-polychlorophthalocyanine. A minor loss of halogens may occur during the synthesis.

(F) Bromination of a phthalocyanine

A phthalocyanine is brominated by an inorganic bromide such as sodium, potassium or aluminum bromide in the presence of chlorosulfonic acid independent of the degree of chlorination. When used with an unchlorinated compound, a polybromophthalocyanine is formed. From about 3 to 14 bromine atoms may be introduced by this method, the compounds having from about 3 to 5 bromine atoms being preferred. The polybromophthalocyanines may be recovered as pigments and used as such, or may be used as a starting material for a subsequent chlorination as described in more detail in paragraph A above.

Because of commercial and economic considerations the copper phthalocyanines are generally preferred and meet with greatest commercial acceptance. Phthalocyanines having hydrogen or other metals as the central group in the molecule are produced by these methods and form excellent pigments. Such pigments are readily prepared commercially to meet the market demand.

Normally if a bromination followed by chlorination is attempted in an aluminum chloride-sulfur dioxide melt, using a metal free phthalocyanine as a starting material, the central hydrogen atoms are replaced by aluminum to yield an aluminum polyhalophthalocyanine. Where a metal free phthalocyanine is desired, a metallized phthalocyanine having the desired degree of alpha-bromo- beta-chlorination is formed, and then the central metal atom is substituted by hydrogen using a strong acid. The replacement of the central metal atom by hydrogen is particularly conveniently accomplished using antimony alpha-poly-bromo- beta-polychlorophthalocyanine as the starting material as the antimony is readily replaced by acid. Other central metal atoms may be replaced by hydrogen using more vigorous conditions.

The scope of the present invention is set forth in the appended claims, but the invention is more easily understood and is illustrated by certain specific representative embodiments set forth in the following examples in which parts are by weight unless otherwise specified:

EXAMPLE 1

*Bromination, then chlorination of copper phthalocyanine*

Sulfur dioxide is first swept through a reactor containing, and then is absorbed by, 350 parts of aluminum chloride (anhydrous) while keeping the temperature between 25° C. and 80° C. until a clear melt is obtained. Approximately 1 mol of sulfur dioxide is required per mol of aluminum chloride (about 168 parts). Some of the sulfur dioxide escapes so that it is more convenient to add an excess. Up to 100% excess may be added as aluminum chloride forms both a mono- and a di- addition compound with sulfur dioxide. (The higher additions of sulfur dioxide increase the usage without sufficiently compensating advantages and, the extra sulfur dioxide may be released to the discomfort of operators.) In the closed vessel is then added at 38° C., 42 parts of liquid bromine followed by 30 parts of copper phthalocyanine. The mixture is stirred to keep it homogenous and held at between 43° C. and 57° C. for 2 hours and then further heated during the course of 2½ hours to 15° C. for 4 hours. The product contains about 5 bromine atoms per molecule. As judged by the relative intensity of the alpha and beta peaks at 790 millimicrons and 840 millimicrons respectively in concentrated sulfuric acid about 4 are in the alpha position. After the bromination is completed, 1½ parts of ferric chloride and 3 parts of iodine are added as a catalyst and chlorine gas is then introduced at a temperature between 100° C. and 148° C. for 4 hours resulting in the substitution of about 9 atoms of chlorine, chlorine being predominantly in the beta position.

The reaction mixture is drowned by adding the mixture as a fine stream to a mixture of 3,000 parts of water and 300 parts of concentrated hydrochloric acid. The bright yellowish-green precipitate thus formed is isolated by filtration, washing with water, and drying. The product is in pigmentary form and shows an analysis of about 5 atoms of bromine and 9 atoms of chlorine per molecule ($C_{32}H_2N_8Br_5Cl_9Cu$). It is not to be anticipated that the product is a single compound in the sense that there are exactly 5 atoms of bromine and 9 atoms of chlorine on each and every phthalocyanine molecule, but instead this is the average degree of substitution for an average molecule although the individual molecules may vary considerably.

When the dried product is tested as a pigment in lithographic varnish or enamels, the green pigment is yellower in shade and stronger tinctorially than a product otherwise similar in conditioning and bromine and chlorine content but in which the orientation of the bromine and chlorine atoms is random.

EXAMPLE 2

*Bromination, then chlorination of copper phthalocyanine*

A mixture is prepared containing equal molar portions of aluminum chloride and sulfur dioxide by placing 400 parts of aluminum chloride, protected from water, in an autoclave and first sweeping the autoclave with sulfur dioxide to flush air therefrom, and then adding sulfur dioxide at about 30 pounds per square inch gauge pressure at 50° C. until a clear melt is formed with an equal molecular ratio of sulfur dioxide. To the melt is then added 37 parts of elemental bromine and 37 parts of copper phthalocyanine with stirring. The mixture is stirred for 2 hours while holding the temperature between 52° C. and 58° C. The autoclave is flushed with nitrogen to remove surplus bromine and 3 parts of iodine and 1½ parts of ferric chloride are added. The mixture is heated over a period of 1½ hours to 90° C. at which point 160 parts of chlorine are added over a 3½ hour period as the temperature is gradually raised from 90° C. to 115° C. The mixture is then swept with nitrogen and drowned into 3,000 parts of water containing 200 parts each of sulfuric and xylene sulfonic acids. 185 parts of ortho-dichlorobenzene is added to the mixture with agitation which causes the pigment to flush into the ortho-dichlorobenzene layer forming a paste of pigment and ortho-chlorobenzene, which is washed first with sulfuric acid and then with water. The paste is mixed with a dilute alkaline sodium xylene sulfonate and ortho-chlorobenzene, and steam stripped while the mixture is stirred intensely (by an Eppenbach mixer). The pigment is filtered, washed free of alkali and dried. The product is in pigmentary form and contains approximately 6 bromine and 8 chlorine substituents average per phthalocyanine molecule. ($C_{32}H_2N_8Br_6Cl_8Cu$). The product is pigmentary in size which may be dispersed by stirring in a lithographic printing ink or alkyd enamel giving a bright yellowish green, stable, lightfast, strong color. The dominant wave length of the product is about 501 millimicrons.

EXAMPLE 3

*Bromination, then chlorination of copper phthalocyanine*

Gaseous sulfur dioxide is passed into a reactor containing 350 parts of aluminum chloride at about 60° C. until a clear melt is obtained. About 170 parts are required. 30 parts of copper phthalocyanine are added, 47 parts of bromine in elemental form, and the mixture is stirred and held between about 60° C. and 65° C. for 2 hours. Nitrogen gas is passed through the mixture to eliminate unreacted bromine and then 3 parts of iodine and 1½ parts of ferric chloride as catalyst are added, and chlorine gas is passed into the mixture while raising the temperature slowly to 130° C. After 4½ hours at 130° C. the total number of halogens is about 14½. The mixture is then drowned by adding it as a fine stream with stirring to a mixture of 3,000 parts of water and 300 parts of concentrated hydrochloric acid. The bright yellow-green pigment is isolated by filtration, washed with water and dried at 65° C. The product contains 8.5 atoms of bromine and 6.1 atoms of chlorine per molecule, the bromine predominantly in the alpha position and the chlorine predominantly in the beta position. When tested in lithographic printing ink or alkyd enamel the pigment is much yellower in color than a chlorinated copper phthalocyanine having 14.6 chlorine atoms. The dominant wave length of the pigment obtained is about 504.5 millimicrons.

EXAMPLE 4

*Highly halogenated copper phthalocyanine—with ortho-dichlorobenzene flushing*

Approximately 170 parts of sulfur dioxide gas is passed into 350 parts of anhydrous aluminum chloride to give an equi-molecular mixture, the addition being started at 25° C. and finished at about 125° C., and under slight pressure. The melt is cooled to 70° C., and 37 parts of elemental bromine and 30 parts of copper phthalocyanine are added to the closed reactor, the mixture stirred and held at 58 to 70° C. for 2 hours, at which time the average bromine substitution is found to be 6.7 per molecule, of which about 5 are in the alpha position.

3 parts of iodine and 1.5 parts of ferric chloride are added, the mixture heated to 90° C. and chlorine passed in while gradually raising the temperature to 116° C. The chlorine addition is discontinued when an average of 15.6 halogens have been introduced.

The mixture is drowned by pouring it as a fine stream into a vigorously stirred mixture of 135 parts of concentrated sulfuric acid and 100 parts of xylene sulfonic acid and 3,000 parts of water. After the drowning is complete and the mixture well stirred, 300 parts by volume of ortho-dichlorobenzene are added and the mixture stirred to flush the pigment into the solvent phase, which forms an easily separated paste which is separated and again washed with water. The ortho-dichlorobenzene is removed from the paste by steam distillation, and the wet pigment is dried to give a bright green pigment of excellent texture. The product contains 6.7 atoms of bromine predominantly in the alpha positions and 8.9 atoms of chlorine predominantly in the beta positions. This is a total of 15.6 halogen atoms per molecule of copper phthalocyanine.

This pigment, as is the pigment from other examples, is crystallization resistant, as is proved by subjecting the pigment to boiling in xylene for one hour, or holding in toluene at 55° C. for 3 days, or holding at room temperature in xylene for one year, all of which tests are passed without deleterious crystal growth.

Although the pigment from the synthesis is an excellent pigment, dispersibility may be improved by mixing in a dough mixer for one hour with one part pigment, 0.5 part aniline, and two parts sodium chloride, followed by washing with dilute sulfuric acid to remove the salt and aniline, washing with water and drying.

The pigment is light-fast as shown by testing under the Florida sun, on outdoor exposure racks, for one year, without appreciable change. The pigment shows no appreciable change when tested for 400 hours in a Fade-Ometer.

EXAMPLE 5

*Alcohol wash*

The procedure of Example 4 is followed except that the ortho-dichlorobenzene solvent paste is washed with denatured ethanol to remove the ortho-dichlorobenzene. After the ortho-dichlorobenzene is removed, the alcohol is removed by evaporation which gives a bright green pigment with characteristics similar to those produced by steam distillation.

EXAMPLE 6

A mixture of 300 parts of anhydrous aluminum chloride, 110 parts of sulfuryl chloride and 24 parts of liquid bromine was prepared in a reactor to which was added 30 grams of copper phthalocyanine and the mixture stirred for 1½ hours while maintaining the temperature between 55 and 61° C. About 3 bromine atoms were introduced in alpha positions. 3 parts of iodine and 1.5 parts of ferric chloride were added and the temperature raised to 80° C. Chlorine gas was then introduced over a period of 2 hours while raising the temperature to 144° C. The catalyst and the higher temperature resulted in chlorination, predominantly in the beta position.

After isolating, as in Example 1, the pigment analyzed 3.4 atoms of bromine, predominantly in the alpha positions and 12 atoms of chlorine, a major part of which were in the beta positions.

EXAMPLE 7

*Chlorination of copper alpha-bromophthalocyanine*

Using the procedure described in United States Patent 2,825,733, Kehe and Horne, "Method for Making Metal Phthalocyanine Pigments," Mar. 4, 1958, copper tetrabromophthalocyanine is prepared by the reaction of 3-bromophthalimide, urea, copper nitrate and titanium tetrabutylate in trichlorobenzene at 180° to 200° C. for 4 hours. The copper bromophthalocyanine produced is added to an equi-molecular mixture of aluminum chloride and sulfur dioxide, following the general procedure of Example 4. Iodine and ferric chloride are added as a catalyst while chlorine gas is passed through at a temperature gradually increasing from 90° C. to 160° C. over a period of 3 hours. A product is obtained which analyzes 4 alpha bromine and about 9 chlorine atoms per molecule, predominantly in the beta position.

EXAMPLE 8

*Bromination of copper beta-chlorophthalocyanine*

Using 4,5-dichlorophthalic anhydride in the synthesis described in Example 7, copper octachlorophthalocyanine is synthesized having the chlorine atoms in the beta position. A melt is prepared containing 520 parts of aluminum chloride and an equi-molar portion of sulfur dioxide to which melt is added 44.3 parts of the said copper octachlorophthalocyanine. 37 parts of liquid bromine are added and the melt is held between about 58° and 70° C. for 2 hours. The mixture is drowned by pouring into an aqueous solution using the procedure set forth in Example 4.

The product has the chlorine in the beta position and is found to contain 6 atoms of bromine. The dominant wavelength of the pigment is about 501.0 millimicrons.

EXAMPLE 9

To a mitxure of 520 parts of aluminum chloride and an equi-molar proportion of sulfur dioxide is added 37 parts of liquid bromine, the melt being at 50° C. The bromine dissolves rapidly. To this mixture is added 37 parts of copper phthalocyanine, with stirring, and the solution is stirred for an additional 2 hours while holding the temperature at approximately 55° C. (within about ±3°). Thereto is then added 160 parts of chlorine over a 3½ hour period as the temperature is gradually raised from 90° C. to 115° C. The mixture is swept with nitrogen to remove surplus chlorine and then drowned in about 3,000 parts of water containing 135 parts of sulfuric acid and 100 parts of xylene sulfonic acid. 300 parts of ortho-dichlorobenzene is added and the mixture stirred to flush the pigment into the solvent layer. The paste is separated from the aqueous layer and washed with dilute sulfuric acid and then water. The pigment is then added to a dilute alkaline sodium xylene sulfonate and the ortho-dichlorobenzene is removed by steam distillation while the mixture is stirred. The pigment is washed free of alkali and then dried. The product is in pigmentary form and no further treatment is required. The product has approximately 6 bromines predominantly in the alpha positions and 8 chlorines predominantly in the beta positions.

An excellent pigment is produced, which has a dominant wavelength of about 501 millimicrons.

EXAMPLE 10

*Bromination by sodium bromide of copper chlorophthalocyanine*

A mixture is prepared of 30 parts of aluminum chloride, 2½ parts of sodium bromide, 0.2 part of ferric chloride and 0.5 part iodine. The mixture is heated to about 60° C. and sulfur dioxide passed in until the mixture is molten, requiring approximately 1 mol of sulfur dioxide per mol of aluminum chloride. To this mixture is added 4 parts of copper octachlorophthalocyanine having the chlorine substituents in the beta position prepared from 4,5-dichlorophthalimide by the urea process shown in United States Patent 2,214,477, using nitrobenzene as the solvent. After heating to 120° C., 3½ parts of chlorosulfonic acid is added over a period of 1 hour. The mixture is then heated to 170° C. over another hour and drowned into 1,000 parts of ice slush containing 100 parts of concentrated hydrochloric acid. The resulting bright green pigment is isolated by filtering, washing acid free, and drying. The product is a copper phthalocyanine pigment analyzing 8.7 atoms of chlorine and 3.2 atoms of bromine. The pigment is easily dispersed in lithographic inks and enamel.

EXAMPLE 11

*Beta chlorination, then bromination*

A mixture is prepared of 320 parts of aluminum chloride, 14.5 parts of sodium bromide, 0.7 part of ferric chloride and 1.5 parts of iodine; and to this mixture is added sulfur dioxide until the reaction mass becomes molten at 70° C.

15.5 parts of copper heptachlorophthalocyanine is prepared by chlorinating copper phthalocyanine in trichlorobenzene with chlorine gas at 120° C. for 6 hours, which introduces the chlorine atoms predominantly in the beta position.

The copper heptachlorophthalocyanine is charged to the said melt and after heating to 130° C., 19.5 parts of chlorosulfonic acid is added in small increments over a 2 hour period, the mixture heated to 190° C., permitted to cool to 160° C. and then drowned in ice dilute hydrochloric acid as in Example 10.

The product analyzes 7.4 atoms of chlorine and 4.5 atoms of bromine, the chlorine being predominantly beta and the bromine predominantly alpha. A bright yellowish copper phthalocyanine green is obtained which is easily dispersed in lithographic varnishes or paint systems.

The sodium bromide plus the chlorosulfonic acid released the bromine, and brominated the phthalocyanine under the reaction conditions.

EXAMPLE 12

*Bromination, then chlorination of aluminum phthalocyanine*

Using the general procedure of Example 3, gaseous sulfur dioxide is passed into a reactor containing 350 parts of aluminum chloride at about 60° C. until a clear melt is obtained. 175 parts are added. To this mixture is added 47 parts of elemental bromine and 30 parts of aluminum phthalocyanine. The mixture is stirred and held between about 60° C. and 80° C. for 2 hours. The excess bromine is swept out with nitrogen; then 3 parts of iodine and 1½ parts of ferric chloride are added and chlorine is passed into the mixture while raising the temperature slowly to 130° C. After 5 hours at 130° C. the total number of halogens is about 14. The mixture is drowned by adding it as a fine stream with stirring to a mixture of 3,000 parts of water and 300 parts of sulfuric acid. The thus produced aluminum alpha-polybromo-beta-polychlorophthalocyanine is isolated by filtration, washed with water and dried. The resultant pigment is yellowish green and may be dispersed in lithographic ink or enamels. The pigment is a strong bright color.

The chlorination may be readily accomplished in the absence of the ferric chloride and iodine catalyst, but a longer time is required.

EXAMPLE 13

*Antimony and metal free alphapolybromo, beta-polychloro phthalocyanines*

The procedure of Example 12 is followed starting with antimony phthalocyanine.

When recovered by drowning in acidulated water, the antimony is displaced and metal free alphapolybromo-beta-polychlorophthalocyanine is obtained as a yellowish green pigment.

The metal free alpha - polybromo-beta-polychlorophthalocyanine may be converted to the corresponding metal phthalocyanine by treating with a salt of such metal, for instance copper chloride, in a basic solvent such as pyridine or quinoline, using conventional procedures.

The aluminum chloride melt is drowned in water buffered with sodium acetate to prevent hydrolysis from which the antimony alpha - polybromo-beta-polychlorophthalocyanine may be separated as the alumina lake or recovered independently.

Other metallic phthalocyanines may be polyalpha-brominated and polybeta-chlorinated using the procedures of Example 12. Among the phthalocyanines which can be halogenated are the metal free, and aluminum, antimony, cadmium, chromium, cobalt, copper, iron, lead, molybdenum, nickel, tin and zinc phthalocyanines.

The above examples are illustrative of the present invention, the scope of which is set forth in the appended claims.

We claim:
1. A process for preparing a yellowish shade green pigment of the phthalocyanine series of the formula:

$$C_{32}H_{16-x-y}N_8Br_xCl_yMe$$

where Me represents the central group of a phthalocyanine molecule selected from the group consisting of 2 atoms of hydrogen and one atom each of aluminum, antimony, cadmium, chromium, cobalt, copper, iron, lead, molybdenum, nickel, tin, and zinc and $x$ is between about 3 and about 9, and at least 60% of the bromine atoms are attached in the alpha positions on the benzo rings, and $y$ is between about 6 and about 13, and at least 60% of the chlorine atoms are attached in the beta positions on the benzo rings, and the sum of $x$ and $y$ is between about 9 and 16; in pigmentary form, having a particle size of less than one micron, and characterized as being crystallization resistant, stable, light-fast, and strong, comprising: contacting a phthalocyanine in a mixture of anhydrous aluminum chloride and sulfur dioxide containing at least about 0.5 mol of sulfur dioxide per mol of aluminum chloride, with elemental bromine and reacting by heating until at least about 3 and not more than about 9 of the benzo hydrogens, at least 60% in the alpha position, are replaced by bromine; and then adding elemental chlorine with heating until between about 6 and about 13 of the benzo hydrogens, at least 60% in the beta position are substituted by chlorine and the total substituents average between about 9 and 16, and drowning the reaction mixture in an aqueous solution, and separating and recovering the thus formed phthalocyanine in pigmentary form.

2. The process of claim 1 including the additional step of treating antimony bromochlorophthalocyanine with an acid to produce metal free bromochlorophthalocyanine.

3. A process for preparing a yellowish shade green pigment of the phthalocyanine series of the formula:

$$C_{32}H_{16-x-y}N_8Br_xCl_yCu$$

and $x$ is between about 3 and about 9, and the bromine atoms are attached at least 60% in the alpha positions on the benzo rings, and $y$ is between about 6 and about 13, and at least 60% of the chlorine atoms are attached in the beta positions on the benzo rings, and the sum of $x$ and $y$ is between about 9 and 16; in pigmentary form, having a particle size of less than one micron, and characterized as being crystallization resistant, stable, light-fast, and strong, comprising: contacting copper phthalocyanine in a mixture of anhydrous aluminum chloride and sulfur dioxide containing at least about 1 mol of sulfur dioxide per mol of aluminum chloride, with elemental bromine and reacting by heating between about 35° C. and 100° C. until at least about 3 and not more than about 9 of the benzo hydrogens, at least 6% in the alpha position, are replaced by bromine; and then adding elemental chlorine with heating between about 75° C. and 150° C. until between about 6 and about 13 of the benzo hydrogens, at least 60% in the beta position, are substituted by chlorine and the total substituents average between about 9 and 16, and drowning the reaction mixture in an aqueous solution, and separating and recovering the thus formed copper bromochlorophthalocyanine in pigmentary form.

4. A process for preparing a yellowish shade green pigment of the phthalocyanine series of the formula:

$$C_{32}H_{16-x-y}N_8Br_xCl_yCu$$

where $x$ is between 5 and 7 and the bromine atoms are attached at least 60% in the alpha positions on the benzo rings and $y$ is between 7 and 9 and the chlorine atoms are at least 60% in the beta position on the benzo rings; in pigmentary form having a particle size of less than 1 micron and characterized as being crystallization resistant, stable, light-fast, and strong, and having a dominant wave length of about 501 millimicrons comprising: dissolving copper phthalocyanine in a mixture of anhydrous aluminum chloride and sulfur dioxide containing at least about 1 mol of sulfur dioxide per mol of aluminum chloride and reacting with elemental bromine by heating between about 35° C. and 100° C. until at least about 5 and not more than 7 of the benzo hydrogens predominantly in the alpha position are replaced by bromine and then adding elemental chlorine with heating between about 75° C. and 150° C. until between 7 and 9 of the benzo hydrogens predominantly in the beta position are substituted by chlorine, drowning the reaction mixture, and separating and recovering the thus formed copper bromochlorophthalocyanine in pigmentary form.

5. A process for preparing a yellowish shade green pigment of the phthalocyanine series of the formula:

$$C_{32}H_{16-x-y}N_8Br_xCl_yCu$$

where $x$ is between 7 and 9 and at least 60% of the bromine atoms are attached in the alpha positions on the benzo rings and $y$ is between 5 and 7 and at least 60% of the chlorine atoms are in the beta position on the benzo rings; in pigmentary form having a particle size of less than 1 micron and characterized as being crystallization resistant, stable, light-fast, and strong, and having a dominant wave length of about 504 millimicrons comprising: dissolving copper phthalocyanine in a mixture of anhydrous aluminum chloride and sulfur dioxide containing at least about 1 mol of sulfur dioxide per mol of aluminum chloride and reacting with elemental bromine by heating between about 35° C. and 100° C. until at least about 7 and not more than 9 of the benzo hydrogens predominantly in the alpha position are replaced by bromine and then adding elemental chlorine with heating between about 75° C. and 150° C. until between 5 and 7 of the benzo hydrogens, predominantly in the beta position, are substituted by chlorine, drowning the reaction mixture and separating and recovering the thus formed copper bromochlorophthalocyanine in pigmentary form.

6. A process for the preparation of a yellowish shade green pigment of the phthalocyanine series of the formula:

$$C_{32}H_{12-y}N_8Br_4Cl_yCu$$

where $y$ is between about 6 and 12 comprising: reacting 3-bromophthalimide, urea, copper nitrate and titanium tetrabutylate in trichlorobenzene thus forming copper α-, α'-, α''-, α'''-tetrabromophthalocyanine adding the thus produced copper tetrabromophthalocyanine to a mixture of aluminum chloride and sulfur dioxide, containing at least about 1 mol of sulfur dioxide per mol of aluminum chloride with catalytic quantities of iodine and ferric chloride, heating to 90° C. and adding chlorine while slowly raising the temperature until not less than about 6 and not more than 12 chlorine atoms are substituted, at least 60% of which are in the beta position, drowning the mixture in an aqueous sulfuric acid solution and separating and recovering the thus formed copper chlorobromophthalocyanine in pigmentary form.

7. A process for brominating a phthalocyanine having replaceable hydrogens attached to the benzo rings comprising: adding said phthalocyanine to a mixture of an inorganic bromine compound and chlorosulfonic acid in the presence of aluminum chloride and heating until at least 3 hydrogens per phthalocyanine molecule are replaced with bromine.

8. The process of claim 7 in which the initial phthalocyanine has not less than 6 and not more than 13 chlorine atoms per molecule at least 60% of which are in the beta position and thereby the bromine atoms are substituted, at least 60% in the alpha position.

9. A process for the preparation of a yellowish shade green pigment of the phthalocyanine series of the formula:

$$C_{32}H_{16-x-y}N_8Br_xCl_yMe$$

where $x$ is between about 3 and about 9, and the bromine atoms are attached predominantly in the alpha position on the benzo rings; where $y$ is between about 6 and 13, and the chlorine atoms are attached predominantly in the beta position on the benzo rings, and the sum of $x$ and $y$ is between about 9 and 16, and Me represents the central group of a phthalocyanine molecule selected from the group consisting of aluminum, antimony, cadmium, chromium, cobalt, copper, iron, lead, molybdenum, nickel, tin and zinc, comprising: selectively chlorinating a metallized phthalocyanine having the same central metal atom as said product in a non-polar solvent with chlorine at a temperature of between about 100° C. and about 150° C. until not less than 6 and not more than 13 chlorine atoms are introduced, at least 60% in the beta position on the benzo rings, recovering the thus chlorinated phthalocyanine and adding it to a mixture of aluminum chloride and sulfur dioxide containing at least about 1 mol of sulfur dioxide per mol of aluminum chloride and adding elemental bromine while slowly raising the temperature until not less than about 3 and not more than 9 bromine atoms are attached, at least 60% in the alpha position, drowning the mixture and separating and recovering the thus formed said phthalocyanine in pigmentary form.

References Cited

UNITED STATES PATENTS

| | | | |
|---|---|---|---|
| 2,195,984 | 4/1940 | Dent et al. | 260—314.5 |
| 2,214,469 | 9/1940 | Linstead et al. | 260—314.5 |
| 2,247,752 | 7/1941 | Fox | 260—314.5 |
| 2,276,860 | 3/1942 | Niemann et al. | 260—314.5 |
| 2,662,085 | 12/1953 | Holtzman et al. | 260—314.5 |
| 2,825,733 | 3/1958 | Kehe et al. | 260—314.5 |
| 2,833,784 | 5/1958 | Ehrich | 260—314.5 |
| 2,862,929 | 12/1958 | Caliezi et al. | 260—314.5 |
| 2,862,930 | 12/1958 | Caliezi et al. | 260—324 |
| 2,873,279 | 2/1959 | Randall et al. | 260—314.5 |

FOREIGN PATENTS 850,237 10/1960 Great Britain.

OTHER REFERENCES

Barrett et al., J. Chem. Soc. (1938), page 1159.

WALTER A. MODANCE, *Primary Examiner.*

I. MARCUS, JAMES A. PATTEN, *Examiners.*

UNITED STATES PATENT OFFICE
CERTIFICATE OF CORRECTION

Patent No. 3,332,961  July 25, 1967

Vito Albert Giambalvo et al.

It is hereby certified that error appears in the above numbered patent requiring correction and that the said Letters Patent should read as corrected below.

Column 1, lines 59 to 75, at the 14 position in the formula, for indistinct notation read -- Cl --; column 2, line 60, for "State" read -- States --; column 3, line 64, for "halog" read -- halo --; column 4, line 19, for "poistions" read -- positions --; line 31, for "reectance" read -- reflectance --; column 8, lines 34, 35, 37 and 38, for "ortho-chlorobenzene", each occurrence, read -- ortho-dichlorobenzene --; column 10, line 42, for "mitxure" read -- mixture --; column 13, line 2, for "6%" read -- 60% --.

Signed and sealed this 11th day of March 1969.

(SEAL)
Attest:

Edward M. Fletcher, Jr.
Attesting Officer

EDWARD J. BRENNER
Commissioner of Patents